United States Patent [19]
Rollin et al.

[11] Patent Number: 4,902,098
[45] Date of Patent: Feb. 20, 1990

[54] DEVICE FOR CORRECTING THE TOTAL DISTORTION CAUSED BY THE SHAPE OF A TRANSPARENT WALL

[75] Inventors: Joël Rollin; Jean-Claude Perrin, both of Vanves; Fernand Loy, Sceaux, all of France

[73] Assignee: U.S. Philips Corporation, New York, N.Y.

[21] Appl. No.: 263,098

[22] Filed: Oct. 26, 1988

[30] Foreign Application Priority Data

Oct. 27, 1987 [FR] France ................................ 87 14831

[51] Int. Cl.$^4$ ........................ G02B 5/04; G02B 27/00
[52] U.S. Cl. .................................. 350/286; 350/447; 350/421
[58] Field of Search ................ 350/286, 174, 447, 421

[56] References Cited

U.S. PATENT DOCUMENTS 3,353,892 11/1967 Minns et al. .
4,634,241 1/1987 Kohayakawa et al. .

FOREIGN PATENT DOCUMENTS 208003 9/1986 Japan ..................................... 350/286

*Primary Examiner*—Jon W. Henry

[57] ABSTRACT

Device used in aviation for in-flight reception of images corrects distortion resulting from the observation of a field of view through a wall (1) which is transparent in a given spectral band and whose shape distorts the image of the scene formed on a receiver (4). An optical system arranged between the receiver and the wall performs an anamorphotic function in one direction and a deviation function in another direction perpendicular thereto. The deviation function is realized by a single prism formed by two parts (5,6) cemented to one another and which have different refractive indices so as to form an achromatic assembly. The anamorphotic function is obtained by a slight change of the focal length of the receiver in conjunction with the elongation of lines formed by the prism in the direction of the deviation function.

3 Claims, 2 Drawing Sheets

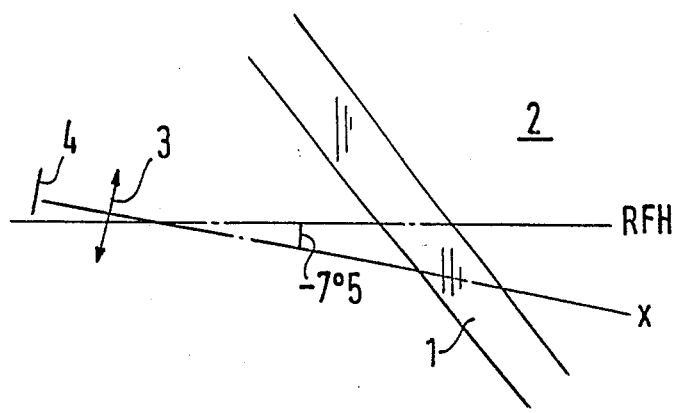
FIG.1
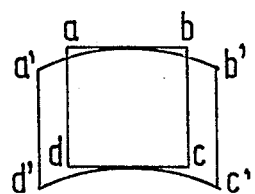
FIG.2A
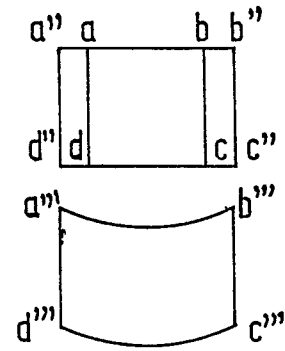
FIG.2B
FIG.2C

DEVICE FOR CORRECTING THE TOTAL DISTORTION CAUSED BY THE SHAPE OF A TRANSPARENT WALL

The invention relates to a device for the correction of distortion resulting from the observation of a field of view through a wall which is transparent in a given spectral band and whose shape produces distortion which is not rotationally symmetrical. The device includes an optical system of modular construction operating with parallel beams and arranged at the front of a receiver to introduce such a curvature and variation in length of lines that the resulting distortion is opposed to the total distortion caused by the wall and constitutes an approximate correction value which yields an acceptable residual distortion. The length variation and the curvature are obtained respectively by means of an anamorphotic function in one direction and a deviation function in another direction perpendicular to the latter.

U.S. application No. 123,034 discloses such a device used in aviation where the transparent wall is the window of an aircraft and the receiver is a camera installed on board the aircraft to pick up the scene. The window generally has a conical shape and as a result the optical beams traversing it are subject to a substantial distortion, which must be corrected or at least reduced.

The system does not alter the resolution of the image, it is of a simple and compact construction and it is easy to adjust.

To connect for the total distortion of the image observed by the camera is more difficult because less room is available and the fields of view are larger. Therefore, the curvature to be compensated for is now stronger and it varies very rapidly with the field.

SUMMARY OF THE INVENTION

The optical system proposed in order to solve these additional difficulties has a single prism having two parts which are cemented to each other, which have different refractive indices and which form an achromatic assembly. The deviation function is performed by the prism and the anamorphotic function is realised by a slight change of the focal length of the receiver in conjunction with the elongation of lines formed by the prism in the direction of the deviation function.

BRIEF DESCRIPTION OF THE DRAWING

FIG. 1 shows a diagrammatic sectional view of a part of a conical window 1 of an aircraft, FIGS. 2a–2c illustrate the distortion to be corrected and the distortions introduced for the purpose of correction.

DETAILED DESCRIPTION OF THE PREFERRED EMBODIMENT

Referring to FIG. 1, the window 1 consists of a material which is transparent in a given spectral band.

A video camera observes the flight scene 2 through said window and as a result of the observation through said window the image of the scene formed in the focal plane 4 of the exit pupil of the camera will exhibit an asymmetrical distortion which is to be corrected, the axis X of the camera being disposed at an angle of $-7.5°$ relative to a reference direction RFH defined with respect to the aircraft.

Referring to FIGS. 2a–2c, the window distorts a square abcd into a'b'c'd'. Since the lines a'd' and b'c' remain perpendicular to the side ab of the square, the correction device provides an anamorphosis for constant-azimuth line and a curvature for constant-elevation lines.

Thus, the device transforms the original square into a rectangle a"b"c"d" and the curvature introduced at a'''b''' and c'''d''' should be opposed to that caused by passage through the window.

Figure 3:
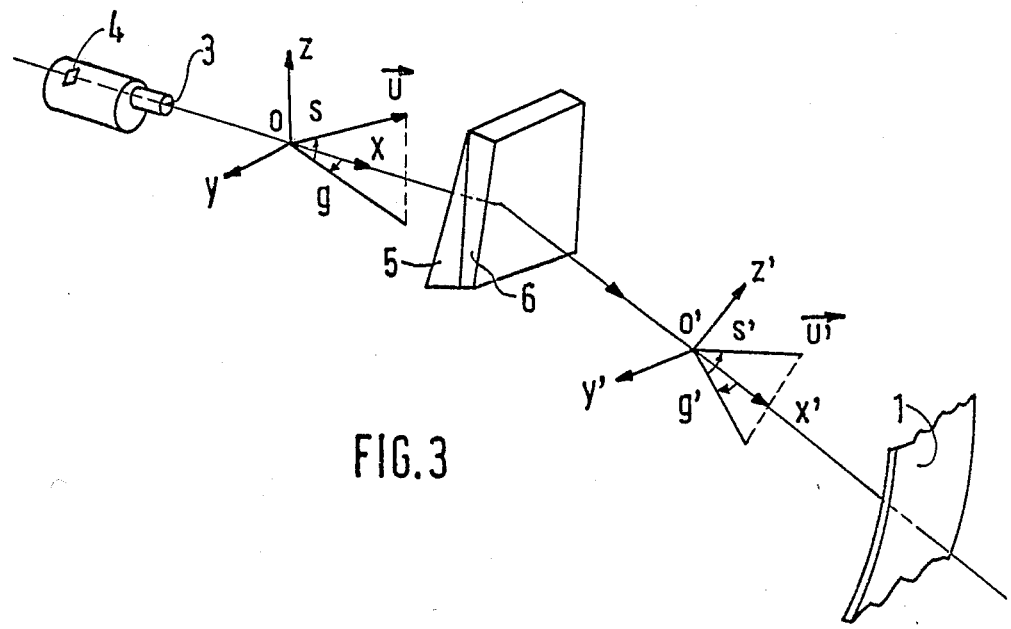
FIG. 3 is a perspective view of the device in accordance with the invention.

The correction is applied by means of an optical system of modular construction arranged between the camera and the window. FIG. 3, shows the path of a ray issuing from the exit pupil 3 of the camera. The achromatic correction system comprising an assembly of two deviation prisms 5 and 6 which are cemented to one another and which are arranged between the pupil 3 and the window 1.

If ox is the optical axis of the camera, the coordinates of any point in space can be defined with respect of a rectangular coordinate system oxyz between the camera and the assembly of prism and a system o'x'y'z' after deviation by said prisms.

For a deviation of the unit vector $\vec{u}$ having the origin o the projection of this vector on the horizontal plane xoy defines the azimuth angle g relative to the axis of ox and the elevation angle s relative to the vector $\vec{u}$.

Similarly, the unit vector $\vec{u'}$ having the origin o' defines the azimuth angle g' and the elevation angle s' in the system o'x'y'z'.

The elevation angle and the azimuth angle relative to the reference direction RFH have the following ranges:

$$s = 4° \text{ and } -18°$$

$$g = \pm 15°$$

The anamorphotic function is realized by a slight change in focal length of the observation camera in conjunction with the prolongation of the constant-elevation lines formed by the assembly of prisms 5 and 6.

The following conventions are adapted to study the path of the light rays by means of a computation program:

before correction the elevation and azimuth origin coincides with the axis ox (camera axis), after correction the origin coincides with ox', ox' coinciding with the optical axis of the camera deviated by the prism.

If these conventions are taken into account the directions before correction will be situated between the following limits:

$$-14° < g < 15°$$

$$-10.5° < s < 11.5°$$

For an elevation s and an azimuth g outside the camera the window distorts the image in such a way that in the scene the elevation and azimuth will be $s + \delta s$ and $g + \delta g$.

The correction system situated between the camera and the window should therefore change a direction (s,g) originating from the camera into a direction ($s - \delta s$, $g - \delta g$).

For computing the anamorphosis in the azimuth direction a change in focal length of the level of the camera is applied. The focal length f becomes f+δf.

When a line of the dimension y is viewed at an angle θ from the nodel point of the camera objective this means that y=f tan θ before the change in focal length and y=(f+δf) tan (θ+δθ) after the change in focal length.

In the case of a compound objective the deviation of y will exhibit a third-order distortion as a function of the field. This results in a second-order distortion for the effective focal length. Consequently, the homethetic ratio of the focal length varies as a function of the field, i.e. as a function of s and of g and should be written as $$\frac{f}{f+\delta f}(s, g)$$

Outside the camera the direction of sight is given by s' and g' in such a way that:

$$\tan s' = \frac{f}{f+\delta f}(s, g) \tan s$$

for g=0;

$$\tan s' = \frac{f}{f+\delta f}(s, g) \frac{\cos g'}{\cos g} \tan s$$

for g ≠ 0, and $$\tan g' = \frac{f}{f+\delta f}(s, g) \tan g$$

regardless of the value of g, s and g being referred to the camera axis.

Before correction the camera objective has the following characteristics.

focal length: 11.2 mm
entrance-pupil diameter ≈ 10 mm.

The spectral range being studied (for the correction of chromatic aberration) is as follows: λmin=405 nm, λmid=556 nm, λmax=850 nm. The deviations have been calculated for λmid.

For a constant azimuth angle the intervals between the lines should be extended; this means that g'>g and δf<0, which calls for a smaller focal length.

The calculations show that an anamorphosis of said lines of the order of 1.064 should be realised.

The new focal length f' as a function of the old focal length is therefore:

$$f' = \frac{f}{1.064} = \frac{11.2}{1.0164} = 10.562 \text{ mm.}$$

In order to obtain the curvature of constant-elevation lines use is made of the property of a deviation prism that for an image of a slit parallel to its refractive edge it introduces a curvature whose concavity is directed towards the base of the prism.

Since in the present case the curvature is very substantial the front prism 5 should produce a substantial deviation. However, the drawback of such a prism is that in the elevation direction it gives rise to a variation in spacing between lines of constant elevation.

In order to reduce this variation another deviation prism 6 is arranged head to tail with the prism 5, which prism 6 should comply with the following requirements:

the deviation produced by this prism should be much smaller in order to ensure that the curvature introduced by the prism 5 is not cancelled, it should operate in the proximity of the minimum deviation towards the upper side of the field.

The total correction is the result of the combination of all these effects:

an anamorphosis in the azimuth direction by a change in focal length, deviation and anamorphosis in the elevation direction, caused by the prism assembly.

Figure 4:
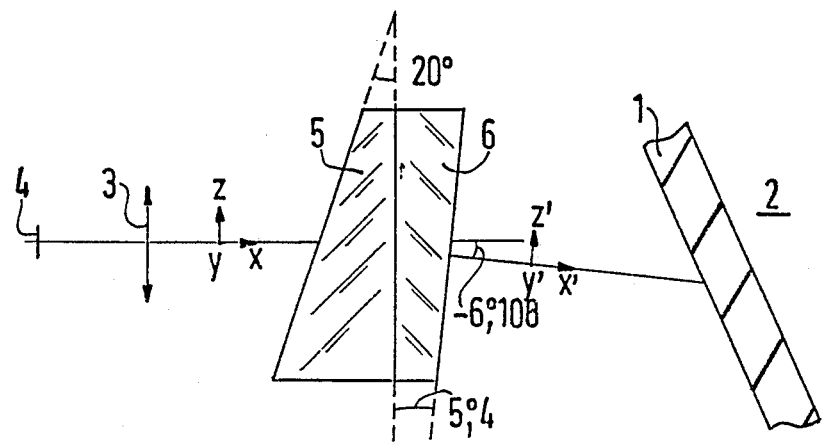
FIG. 4 is a vertical sectional view of the device.

FIG. 4, which is a sectional view of the device taken along the plane xoz, gives the deviation of the optical axis of the camera, which is equal to −6.108° in the downward direction, the apex angle of the prism 5 being 20° and the apex angle of the prism 6 being 5.4°.

The camera-and-prism assembly should therefore be tilted through 6.108° in the upward direction relative to the reference position.

Such a combination is achromatic if the cemented prisms 5 and 6 are made for example, of glass having a refractive index of 1.508 (K7) and of glass having a refractive index of 1.796 (SF6) respectively.

The device in accordance with the invention has the advantage that it is compact and cheap, because it comprises only two optical elements.

On the other hand, the larger deviations of the optical axis entail a larger tilting angle of the correction-device and camera-assembly.

What is claimed is:

1. A modular optical system for correcting image distortion which results from viewing an object through a wall which is transparent in a given spectral band and which has a shape producing non-rotationally symmetrical distortion comprising:

a single prism disposed adjacent said wall, said single prism having first and second parts, cemented together, having different refractive indicia forming an achromatic assembly, providing a deviation function for correcting a curvature distortion produced by said wall in elevation, and producing an anamorphous function in elevation; and, a receiver for viewing a parallel beamed image from said prism having a focal length which in combination with said single prism provides for an anamorphotic function which corrects for line length variations imposed by said wall.

2. The modular optical system of claim 1 wherein said first prism part comprises a first prism having an apex angle of substantially 20°.

3. The modular optical system of claim 1 wherein said second prism part has an apex angle of substantially 5.4°.

* * * * *